Nov. 3, 1964 T. A. BRANDON 3,155,245
LUMBER ACCUMULATORS
Filed Nov. 29, 1960 4 Sheets-Sheet 1

Fig. 1.

INVENTOR.
THEODORE A. BRANDON
BY *Mathis and Graybeal*
ATTORNEYS

United States Patent Office 3,155,245
Patented Nov. 3, 1964

3,155,245
LUMBER ACCUMULATORS
Theodore A. Brandon, 1926 SE. Ash, Portland, Oreg.
Filed Nov. 29, 1960, Ser. No. 72,485
15 Claims. (Cl. 214—16)

The present invention relates to accumulating mechanisms having a series of storage areas or bins each receiving and segregating an allocated classification and number of elongated units, such as sawn lumber, and more particularly relates to such accumulating mechanisms as employed in conjunction with automatic sorting equipment delivering or depositing elongated units at spaced intervals along a path of travel, with the accumulator mechanisms providing storage and segregation of an allocated count of units in each storage area for selective delivery thereof as a group to associated transport means such as a takeout conveyor in turn delivering the accumulated units to further handling means, such as a lumber stacker.

Advantageously, but not necessarily, the accumulating mechanisms characterizing the present invention can be employed in conjunction with the sorter mechanism disclosed and claimed in my copending application Serial No. 846,304, entitled Lumber Sorting and Accumulating Mechanisms, filed October 15, 1959, now U.S. Patent No. 3,116,835, of which application this application is a continuation-in-part.

Heretofore, accumulating mechanisms for lumber and like elongated units according to classification are quite complex constructionally and necessarily occupy considerable plant space. In addition, some prior lumber accumulating units involve a considerable distance of free fall of the sorted lumber into the storage area, particularly when the storage area is substantially empty, which has the objectionable result of marring or nicking of the lumber. Also, prior lumber accumulating mechanisms often entail practical difficulties in terms of reliable interrupt of lumber feed after delivery of a predetermined count thereof to the accumulator, and difficulties in achieving a desired manner of discharge of an accumulated lumber package to outfeed transport means.

In order to overcome the disadvantage of such prior accumulating devices, the present invention has as its basic objects, features and advantages the provision of lumber accumulating mechanism wherein the extent of free fall of the lumber units from a sorter into an accumulator bin is substantially reduced and maintained generally constant throughout a delivery cycle; wherein positive and reliable automatically actuated interrupt means is provided in the path of travel of units into the main storage area of the accumulator so that there is segregation of a predetermined count of units, and so that a group of units made up of lumber such predetermined and particular count can be removed from the accumulator storage area without interrupting the count of the next group of units being accumulated or without interrupting the operaion of the associated sorting mechanisms; wherein various accumulator constructions are provided by means of which the discharge of a group of units therefrom can be readily achieved in a desired manner, i.e. either with the units delivered essentially one by one or as a compactly placed group on an associated outfeed transport means, depending upon the manner in which the group of units should be delivered to the next equipment handling same in a plant sequence; wherein the construction and arrangement of a series of accumulators is essentially simple and durable, as well as rather compact both vertically and horizontally, with a preferred arrangement in this respect being with a series of accumulators taking only sufficient space under a sorting line so as to be laterally essentially no wider than the sorting line and so as to be vertically housable within a single story of a plant facility; wherein an arrangement of a series of accumulator bins achieves overall compactness and reliable discharge of accumulated units therefrom in the desired manner by utilizing a series of sets of straight skid beams disposed at a relatively shallow slope so that the delivery of units from a sorter into an accumulator storage area principally involves sliding movement a short distance on the beams rather than extended free fall with sharp impact; wherein each such accumulator storage area is defined by upper and lower sets of sloped skid beams with lowering arms or gates, the lowering gates being pivotally depended from trolley means moved downwardly along the upper set of skid beams, the extent of such downward movement of the trolley means and lowering gates being controlled by the number of lumber units accumulated in the storage area; wherein simple and positive interrupt means are provided on the upper portion of such skid beams to intercept units being delivered to the accumulator from the sorter after the number of units delivered to the sorter have reached a predetermined count, which interrupt means is preferably pivotally movable about an axis just below the line of travel of the units and which means is ideally essentially made up of a plurality of pivotally movable elements configured essentially in the form of a sector of a cylinder so as to not of themselves mar or nick the interrupted units, either when in interrupt position, or when being withdrawn from such position; wherein the main accumulating section of each accumulator bin has associated therewith discharge mechanism including manually operable gate means opened when discharge of the bin is desired, one form of such discharge means also incorporating a discharge conveyor chain means coursing a raised path of travel which forms a constricted throat at the lower end of the accumulator bin, and functioning to deliver units from the bin essentially one at a time, such discharge section in another form incorporating a counterweighted set of pivoted beams which in normal position close the discharge end of the accumulator and which when released from normal position move to form a substantially aligned extension of the skid beams in the accumulator to provide ready discharge of accumulated units therefrom as a compactly placed group; wherein such accumulator mechanism has associated therewith a counter means actuated each time a unit is delivered to the accumulator, which counter means in turn operates to regulate progressive movement of the lowering gates in the main accumulator section of the accumulator bin, and also operates to automatically actuate the said interrupt means upon delivery of a sufficient number of units to the main accumulator section of the bin to form a standard-sized unit "package"; and wherein the control sequence for each accumulator, involving such counter mechanism and its control of the lowering gates in the main accumulator section along with the interrupt means, is characterized by being primarily non-electrically actuated to avoid maintenance complications such as often encountered in a plant environment.

These and other objects, features, advantages and characteristics of accumulators designed according to the principles of the present invention will be apparent from the following description of certain typical and therefore non-limitive embodiments thereof, taken in conjunction with the accompanying illustrations of such embodiments, wherein like numerals refer to like parts, and wherein:

Figure 1:
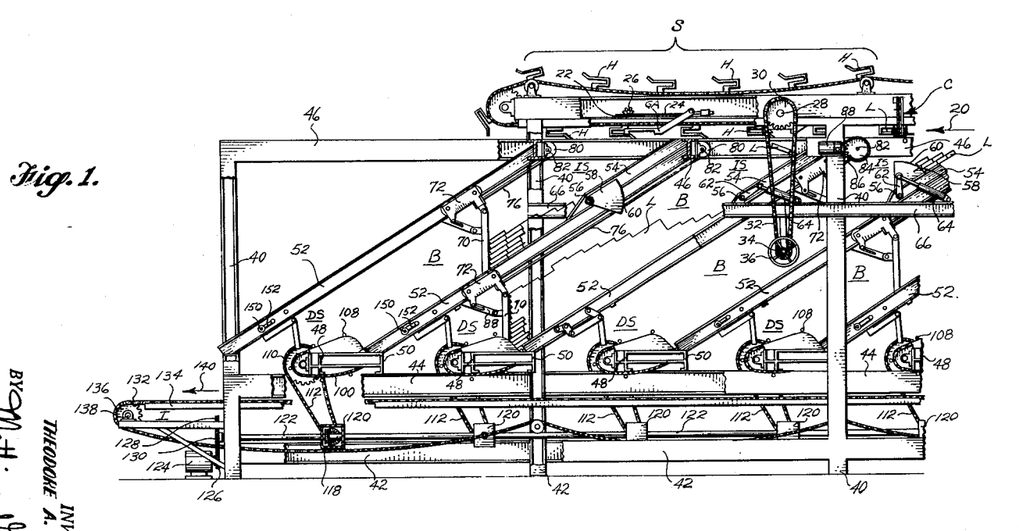
FIG. 1 is a fragmentary view in side elevation of a series of accumulator bins according to the present invention, shown in conjunction with a fragment of a sorting stage and a fragment of a takeout conveyor means associated with the bins in a typical installation.
Figure 2:
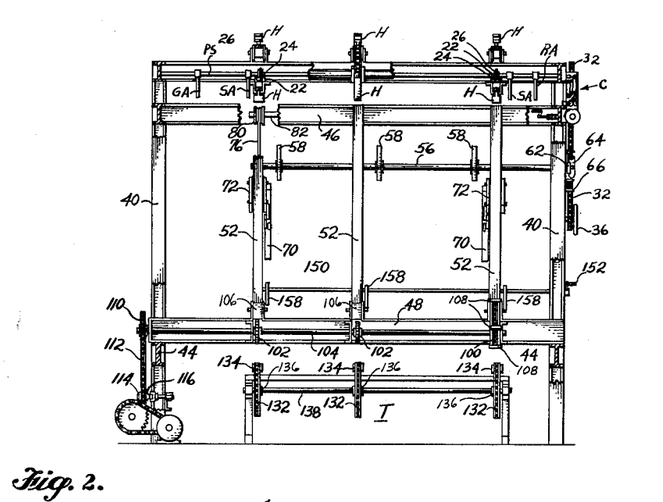
FIG. 2 is a view in end elevation of the series of accumulator bins shown in FIG. 1.

Turning to a specific consideration of the form of the invention illustrated in FIGS. 1–6, and giving particular attention first to the overall views of FIGS. 1 and 2, each of the series of accumulator bins designated generally at B underlies a particular sort station of a sorting stage S, the various lumber units L passing through the sorter stage S while being supported by hangers H, the particular sort station at which a given lumber unit L is delivered to an associated accumulator bin B being determined by operation of lumber supporting hangers H along with the sets of sorting arms SA, grade arms GA and reject arms RA (see FIG. 2). Attention is directed to my aforesaid application Serial No. 846,304 for a full disclosure of the constructional detail and manner of operation of said sorter stage S.

As indicated, accumulator mechanisms according to the present invention can be utilized in connection with any type of sorting apparatus, but the vertical compactness of the illustrated sorter stage S, along with the vertical compactness of the accumulator bin structure of the present invention recommends use of the sorter and the accumulator mechanism together for maximum utilization of plant space.

As a constructional refinement in the sorter stage S, the various sets of arms comprising sorting arms SA, grade arm GA and reject arm RA are adjustably settable along the direction of travel 20 of lumber units L through the sorting stage, to provide a regulation as to the point of drop of a given lumber unit in a given acumulator bin B so that the equipment operator can precisely regulate such points of drop of units into the bins B and obtain more even distribution of units therein, as desired. Specifically, the pivot shaft PS mounting the various sorting arms SA, grade arm GA and reject arm RA in each instance is journaled on a pair of slidably mounted guides 22, each of which also carries a rack gear 24 meshed with pinion 26 in turn keyed to shaft 28 journaled on the supporting structure. The means for rotating the various shafts 28, with only one such means being shown at FIGS. 1 and 2 for clarity of illustration, comprises a sprocket 30 linked by a chain 32 to a sprocket 34 and hand wheel 36 in convenient reach of the operator. As will be understood, rotation of hand wheel 36 exerts rotation on shaft 28 in turn rotating pinions 26, whereupon racks 22 are moved under the pinions 26 and consequently move guides 22 to move pivot shafts PS.

As evident from FIGS. 1 and 2, the supporting structure for the various accumulator bins B as well as the sorting stage S includes appropriate posts 40, base beams 42, lower beams 44 and longitudinal and lateral upper beams 46. Lower pairs of lateral beams 48 and 50 associated with the discharge sections DS of the bins B also provide structural rigidity.

Main skid beams 52, as shown, are arranged in a sloping disposition between an associated upper beam 46 and an associated lower lateral beam 50, at a relatively shallow slope of about 30° for example, the storage area in a given accumulator bin B being defined by a lower set of said skid beams 52 and the upper side of the adjacent set of skid beams immediately to the left, as viewed in FIG. 1. In a particular installation for example, to demonstrate illustrative compactness and order of storage area available in a given bin B, the perpendicular distance between said sets of skid beams 52 is three feet two inches, with said skid beams 52 being separated seven feet center-to-center, horizontally considered, the vertical dimension between the top of beams 46 and the top of beams 44 being nine feet, i.e., about the height of one story of a plant facility.

In the upper portion of each accumulator bin B is an interrupter section IS, or what may also be termed a surplus bin, the components of which are designed to isolate and retain any additional units beyond a predetermined count from reaching the main storage area of the bin B until discharge of the accumulated group of units. In each said interrupter section IS, supplementary skid beams 54 are disposed on top of the upper end of skid beams 52 and are spanned by a pivotally movable gang shaft 56 having keyed thereto at spaced intervals (cf. FIG. 2) a plurality of interrupter arms or surplus gate elements 58 which are preferably in a configuration of a sector of a cylinder centered on shaft 56 with their curved surfaces 60 movable to face oncoming lumber units skidding down supplementary skid beams 54. By such sector type configuration of arms or gates 58, there is no marring or nicking of the lumber units L in the interrupter section IS upon their withdrawal from the path of travel of the lumber units L into bin B, as more fully discussed hereinafter. Actuation of said interrupter arms or gates 58 in each instance is by means of a crank arm 62 keyed to shaft 56 at one end thereof, which crank arm 62 is connected to a fluid actuated cylinder 64, preferably but not necessarily of the pneumatic type, in turn anchored to said beams 66 extending longitudinally of the assembly. The sequence of operation of said cylinder 64 is discussed in more detail in connection with the following description of operation of the equipment, as detailed along with the control circuitry shown at FIG. 7.

One primary feature of the accumulating mechanism here presented is that indexed lowering gates span the main storage area of each bin B so that the extent of travel of any given lumber unit L into the main accumulating area is relatively short in all instances. The particular mechanism by means of which this result is achieved includes arrangement in each bin B of a laterally disposed plurality of lowering gates 70 carried by trolley or carriage means 72, with the gates 70 pivotally mounted on the trolleys 72 and associated with latch mechanism so as to normally span the main storage area of a given bin B in locked relation, with the latching mechanism providing that the gates 70 are automatically movable out of the way of the accumulated units L by action of the weight of the units when discharge thereof is desired.

The manner of indexed control of the progressive movement of the set of trolleys 72 and correspondingly the lowering gates 70 carried thereby is discussed in more detail in connection with the control arrangement illustrated in FIG. 7. However, as will be noted in FIGS. 1 and 2 as well as the enlarged detail view of FIG. 3, each such trolley 72 includes a plurality of wheels 74 nested between the flanges of the associated skid beams 52, the said skid beams 52 being suitably of I-beam cross sectional configuration for this purpose, the lowering or elevation of said trolleys 72 being effected by means of respective cables 76 seized to the trolleys 72 at one end 78 (FIG. 3) and led about respective cable drums 80, each set of which is in turn keyed to a trolley drive shaft 82 selectively driven through sprocket 84 and chain 86 by a respective trolley drive motor 88.

Figures 3, 5, 6, 7:
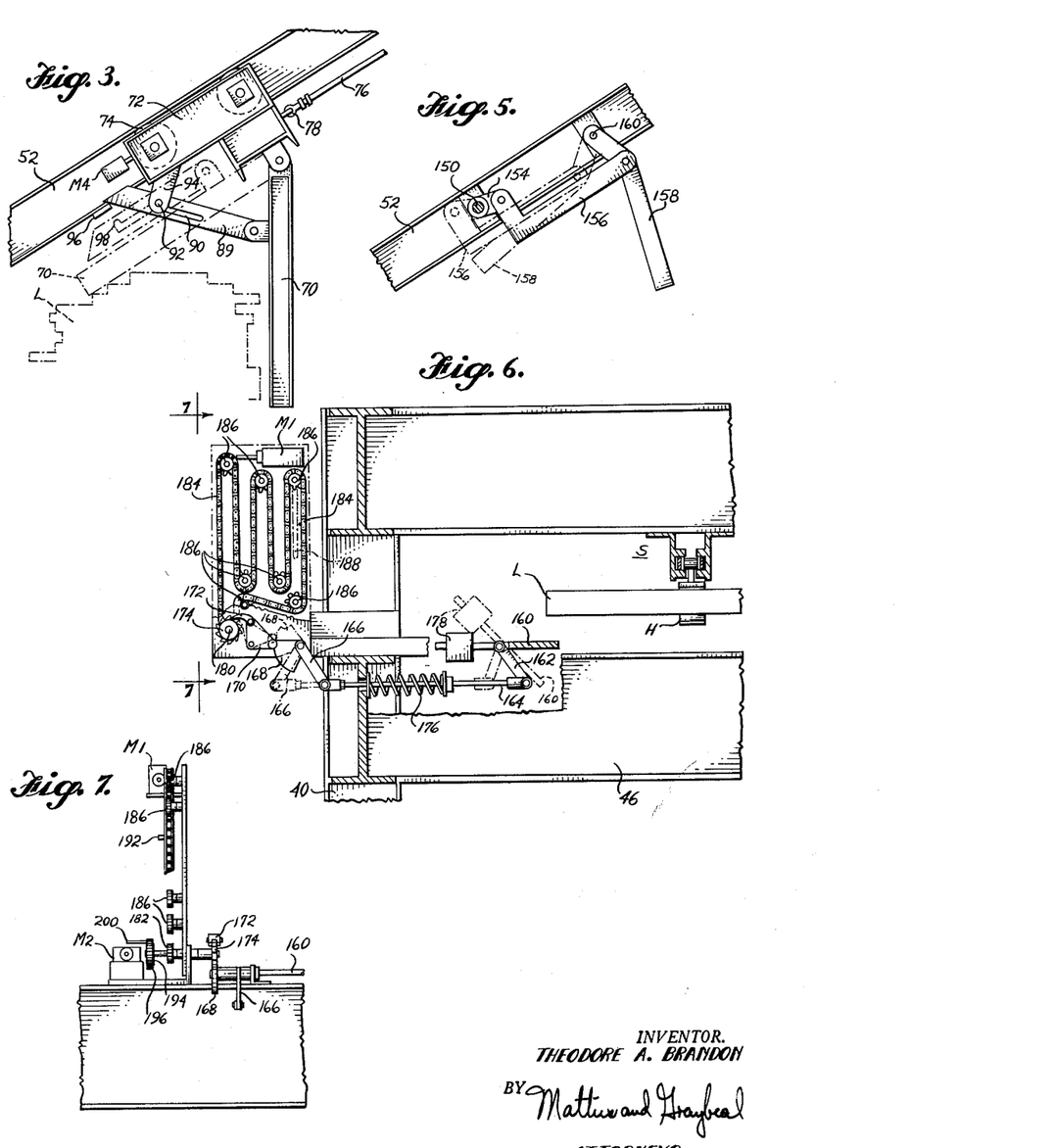
FIG. 3 is a fragmentary view in side elevation and on an enlarged scale showing further detail of the lowering gate, lowering gate trolley, and gate latch mechanism constituting a part of the assembly shown in FIGS. 1 and 2, said FIG. 3 also showing the lowering gate and latch mechanism in broken line to indicate the position thereof when unlatched.
FIG. 5 is a fragmentary detail view in side elevation and on an enlarged scale showing further detail of the bin release means and its actuating linkage.
FIG. 6 is a view in vertical elevation, somewhat schematic as to certain detail for clarity of illustration, showing the nature of the unit actuated counter mechanism for controlling the lumber lowering means and interrupt means of the embodiment of the invention shown in FIGS. 1 and 2.
FIG. 7 is a fragmentary view in vertical elevation, further showing the counter mechanism illustrated in FIG. 6, taken substantially along line 7—7 of said FIG. 6.

The latching mechanism for normally retaining lowering gates 70 in a bin spanning position, which detail is best shown at FIG. 3, comprises a latch bar 89 having a compound slot 90 in which rides a pin 92 mounted on fixed lug 94 standing out from the trolley 72. In FIG. 3, the normal position of such gates 70 with the latch mechanism in extended position is shown in solid line. As trolley 72 courses down skid beam 52, and upon reaching the predetermined lowermost extent of travel thereof, a latch plate 96 attached as by welding to the lower flange of skid beam 52 encounters and raises the free end of latch arm 89, whereupon the lock segment 98 (see broken line showing thereof in FIG. 3) of slot 90 is lifted from pin 92 which can then slide in the main dimension of said slot 90, whereupon the weight of the accumulated lumber units L against lowering gates 70 forces the latch mechanism into collapsed position, the said lowering gates 70 and the latch mechanism thereupon assuming substantially the positions thereof shown at FIG. 3 in broken line, in which positions the discharge of the lumber units L from the main storage area bin B can then proceed.

As will also be apparent with respect to the latch mechanism 89–98 shown in FIG. 3, at such time as trolley 72 is drawn back up skid beam 52 and the free end of latch arm 89 separates from latch plate 96 with no lumber units L remaining to impede the return movement of lowering gates 70, then the weight of said gates 70 and latch arm 89 will cause restoration of the gates 70 to locked, bin spanning position. Once lowering gates 70 again assume a locked, substantially vertical position, they will remain in such position relative to trolley 72 until the end of latch arm 89 again contacts and is raised by latch plate 96 during the next accumulating and discharge sequence.

Figure 4:
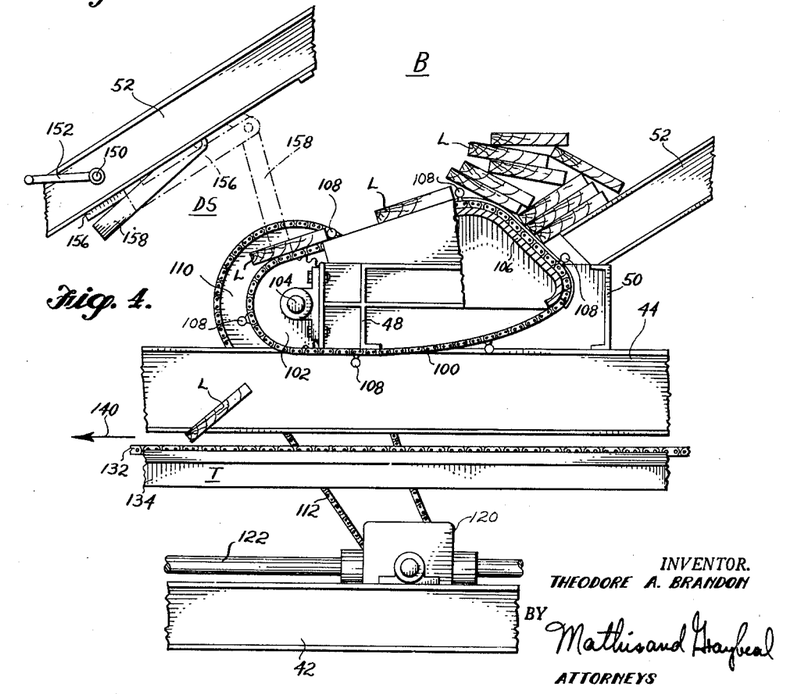
FIG. 4 is a fragmentary detail view in side elevation and on an enlarged scale of a discharge mechanism and bin release means as provided in the discharge section of the accumulator bins shown in FIGS. 1 and 2, such bin release means being shown in open position by solid line and in throat spanning position by broken line, the said FIG. 4 also showing in fragmentary side elevation a portion of the takeout conveyor means below such discharge section.

Each bin B, in the form of the invention shown in FIGS. 1–6, comprises a discharge section DS including a driven discharge chain assembly and manually operated bin discharge gate means, the arrangement providing in the discharge section DS a relatively constricted passage or "throat" through which the accumulated lumber units L are fed essentially one at a time by the discharge chains, with the bin release gate means manipulatable to close or open the relatively constricted discharge end of the discharge chain assembly. As shown in FIGS. 2 and 4, for example, such driven discharge chain mechanism comprises a plurality of discharge chains 100, each led around a drive sprocket 102 keyed to a common drive shaft 104, the course of said chain 100 being along arched guideways or tracks 106 which in their upper extents initially lead the chains upwardly at a relatively sharp angle with respect to the angle of the lower end of skid beams 52, then over a crown to a slightly downward discharge course. One practical form of said chain guideways 106 involves arrangement thereof at an angle of about 70° with respect to the plane of the skid surface of skid beams 52, and at an angle of about 20° with respect to the horizontal along the downward discharge course.

Said discharge chains 100 are provided at spaced intervals with rounded lug means, certain of which are indicated at 108. The primary function of the upward course of chain guideways 106, such as shown at FIG. 4, is to resist movement of the accumulated group of lumber units L from the main storage areas of bin B until such time as the units L are contacted and removed from the group on an essentially individual basis by said lugs 108, the smooth surfaces on said lugs 108 avoiding any substantial marring or nicking of the lumber units L during this procedure. As an individual lumber unit L is picked out from the group by a given lug 108, such eventually moves over the crowns of chain guideways 106 and proceeds along the downward course of the chains until falling off the chains at the discharge ends thereof, the left ends as viewed in FIG. 4. Obviously, said discharge chains 100 are operated as long as units L remain in the main storage area. Suitable drive mechanism for the discharge chains 100 is effected through shaft 104 from a master sprocket 110 at one end of said shaft 104 (note FIG. 2), which sprocket 110 is in turn driven through chain 112, sprocket 114, manually engaged jaw clutch means 116 (operated remotely by suitable linkage, not shown) and bevel gear cluster 118 (FIG. 1) in gear box 120, in turn driven by line shaft 122 extending longitudinally of the equipment assembly and selectively driven by motor 124 (FIG. 1) through sprockets 126 and 128, and chain 130.

As will be readily understood by those skilled in the art, each discharge assembly DS discharges the accumulated lumber units to a suitable transport means, which in certain installations can simply be individual receptacles or platforms. However, and particularly in connection with automatic unit handling equipment for stacking or the like, it is considered preferable to employ a continuously driven transport section, generally indicated at T, comprising continuously driven conveyor chains 132 riding along their upper courses in trackways 134 and passing over outfeed sprockets 136 keyed to a gang shaft 138 which is suitably power driven by a drive motor (not shown) to transfer units discharged from the accumulator bins in the direction of travel indicated at 140. Although the illustrated showing of discharge transport section T in FIG. 1 extends only slightly beyond the discharge point of the last accumulator bin B of the assembly, such showing is thus presented merely for simplicity of illustration, and is to be understood that endless conveyor chains 132, or any desired sequence of conveyor means, can be arranged to extend a distance from the bins B, in order that the accumulated groups of lumber units are appropriately delivered to the next station in a handling sequence, such as a planer, an automatic stacker, or a hand stacking station.

The discharge section DS in each of the accumulator bins B shown at FIGS. 1, 2, 4 and 5, further includes what may be termed bin release gate means operable to span or open the relatively constricted discharge area between the upper set of skid beams 52 and the outfeed end of discharge chains 100. Such bin release gate means is manually operable by the equipment operator whenever discharge of the accumulated units from bin B to transport means T is desired, and is fabricated to lock in either closed or open position by so-called overthrow actuating linkages. As will be understood, at such a time as the trolley means 72 reach their lowermost extent of travel (cf. FIG. 3) and lowering gates 70 are retracted, the accumulated group of units in the main storage area of a bin B are then free to lodge against the discharge assembly, and since discharge chains 100 do not entirely span the discharge sections DS, there is the possibility that some of the accumulated lumber units L would be prematurely discharged from the bin. The bin release gate means functions to prevent such premature discharge, until such a time as the area of transport means T below the discharge section DS is clear, upon which occurrence the operator can simply retract the bin release gate means and engage the drive for the discharge chains 100 (by engagement of jaw clutch 116), whereupon the discharge of the accumulated group of units L from the bin B is commenced and proceeds until the main storage area of the bin B is emptied. Once empty, the clutch 116 is disengaged, stopping the drive of chains 100, and the bin release gate means is re-closed.

Such bin release gate means suitably comprises a gang shaft 150 journaled near the lower end of the upper set of skid beams 52, terminating in a hand lever 152 at the side of the bin and having keyed thereto a plurality of rocker arms 154 in turn pinned to L-shaped links 156, with the ends of such links 156 remote from rocker arms 154 being pinned to intermediate points on gate arms 158 pivotally anchored as by pins 160 to the skid beams 52. As will be evident from an inspection of FIGS. 2 and 5, the configurations of rocker arms 154, links 156 and gate arms 158 are such that rotation of gang shaft 150 to one extreme position provides a self-locking overthrow of rocker arms 154 to maintain said arms 158 in discharge section spanning position, i.e. closed (as shown in solid line at FIG. 5), and such that rotation of said gang shaft 150 to the other extreme similarly provides a self-locking overthrow whereby said gate arms 158 are maintained in retracted position, i.e. open (as shown in broken line at FIG. 5).

FIGS. 6 and 7 show the detail of the unit actuated counter mechanism used for controlling the lumber lowering means in the main storage area and the interrupt means of an accumulator bin B. The counter assembly, generally designated at C, includes a counterweighted hinged plate 160 situated in the path of fall of a lumber unit L from hangers H of the sorting stage S. The weight of a lumber unit L momentarily depresses hinged plate 160, as shown in broken line at FIG. 6, causing link 162 to move spring loaded rod 164 which in turn rotates link 166 and notched cam plate 168. Rotation of cam plate 168 moves rocker crank 170 and its pawl 172 to the positions thereof shown in broken line at FIG. 6, which action indexes ratchet wheel 174 one step or notch. The spring loading on rod 164 exerted by compression spring 176, and the counterweight 178 on hinged plate 160, act to maintain mechanism 160–178 in the normal position thereof shown in solid line at FIG. 6, except when said hinged plate 160 is in contact with a falling lumber unit L.

Ratchet wheel 174 is on a common shaft 180 (FIG. 7) with a counting chain sprocket 182 having the same number of teeth as ratchet wheel 174, so that said counting sprocket 182 is indexed one tooth whenever ratchet wheel 174 is indexed one notch.

Since it is normally desired to accumulate an exact number of lumber units as a group in order to make a "package" of units of a standard size, e.g. 4' by 4' in cross sectional dimension, the counting mechanism C presented by FIGS. 6 and 7 utilizes a counting chain 184 having exactly the same number of links as the desired number of lumber units required to make such a package. For example, a standard sized package of 2 x 4's to make a 4' by 4' package is made up of two hundred eighty-eight units and a counting mechanism C associated with an accumulator bin B collecting 2 x 4's would correspondingly have a counting chain 184 with two hundred eighty-eight links. Counting chain 184 is fed over a series of sprockets 186 suitably spaced and located to compactly accommodate the required number of links of chain 184, and at least one such sprocket 186 preferably has an adjustable throw to facilitate mounting of the chain and to take up chain slack, such as by an adjustment means comprising a slot 188 in which the pin-bolt 190 of one of the sprockets 186 can be moved and set.

Counting chain 184 carries on one of its links a lug pin 192 which cyclically makes contact with and closes an interrupt microswitch M1, which in turn energizes a solenoid operated valve V1 actuating air cylinder 64 in the interrupt section IS, as further discussed in connection with the control arrangement shown in FIG. 8.

The counter assembly C also controls the progressive lowering movement of lowering gates 70 in the main storage area of the associated accumulator bin B in the following manner. Shaft 180, as shown in FIG. 7, has pinned thereto a gear 194 having the same number of teeth as the ratchet wheel 174, which gear 194 is in mesh with a second gear 196 journaled to rotate on a stub shaft (not shown) on trunnion lug 198. The number of teeth in second gear 196 is selected upon a determination as to the number of lumber units L it is desired to deposit in the main storage area of the bin B before its lowering gates 70 are moved downwardly a certain distance to expand the storage area. For example, if it is desired to move gates 70 down after twenty lumber units have been dropped into the bin B, then gear 196 would have twenty teeth. However, should it be determined that indexing of lowering gates 70 should occur after delivery of any other number of units, say ten or thirty, then said gear 196 would accordingly be provided with ten teeth or thirty teeth, as further examples.

A lug pin 200 stands out from gear 196 and is positioned to actuate and close lowering microswitch M2 once each revolution of said gear 196, which microswitch M2 is utilized to control the associated drive motor 88 for the lowering gate trolleys 72, in the manner also discussed below in connection with the mode of operation provided by the control means illustrated in FIG. 8.

Figure 8:
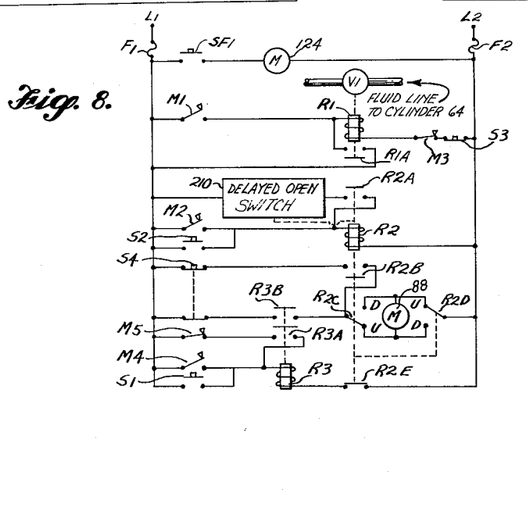
FIG. 8 is a schematic control circuit diagram illustrating the mode of control and reset of each set of lowering gates and interrupt means, as regulated by the counter mechanism shown in FIGS. 6 and 7.

FIG. 8 presents a ladder type circuit diagram portraying the operating sequence in each accumulator bin B, as controlled by the counting mechanism and movement of various components, along with certain manual control functions effected by the equipment operator.

As will be understood, lines L1 and L2 in FIG. 8 represent conventional power lines available to the equipment, which can be either A.C. or D.C. depending upon the nature of reversible drive motor 88 for the lowering mechanism, which lines L1 and L2 are suitably fused as at F1 and F2. The continuous drive motors (not shown) for the sorter stage S and conveyor chains 132 in transport section T are suitably connected directly across lines L1 and L2. Motor 124, which drives line shaft 122 from which the various discharge chain assemblies are selectively driven, is likewise connected across lines L1 and L2 and suitably energized when desired, as by foot operated switch SF1. Normally open limit switch M1, which is momentarily closed by pin lug 192 on the counting chain 134, is placed in the energization circuit for interrupt relay R1, and such energization circuit is completed by a normally closed limit switch M3 situated to be momentarily opened by contact with an associated trolley 72 which encounters same at the upper extent of its travel along the associated skid beam 52, and by a normally closed manual switch S3, which is placed in the circuit to provide means available to the operator to disable the interrupt section IS of the bin B, should such be desired for some operational reason. Contacts R1A of interrupt relay R1 function as an interlock to retain the relay in energized condition after reopening of limit switch M1, until such a time as limit switch M3 or manual switch S3 is opened. Energization of interrupt relay R1 operates solenoid actuated, normally closed, self-restoring valve V1 into the air supply line to cylinder 64. With such energization of relay R1, it will be understood that upon momentary closure of limit switch M1, valve V1 is opened and the interrupt arms 58 are moved into their upper or interrupt position, which condition of energization is normally maintained until such a time as limit switch M3 is opened by one of the trolleys 72 having returned to its uppermost extent of travel, whereupon relay R1 de-energizes, valve V1 closes, interrupter arms 58 move out of the path of travel of any units L accumulated in the interrupter section IS, and such units are then free to slide into the main storage area of bin B, the interrupter arms 58 then remaining in such non-interrupt position until limit switch M1 is again closed by pin lug 192 in the counter mechanism C.

Momentary closure of limit switch M2 by pin lug 200 in counter mechanism C energizes lowering relay R2, closing interlock contacts R2A thereof and also closing a normally open, delayed reopening switch 210, the predetermined delay of which is selected to correspond to a relatively short period of energization of the drive motor 88 for the trolleys 72 which provides an increment of travel of said trolleys 72 along the beams 52 corresponding to the relation of the number of teeth on gear 96 (i.e. number of units received in the bin B per each indexing of the lowering arms 70) as compared with the total number of units necessary to make up an accumulated group or package in the bin B. In other words, if a package requires a total of two hundred eight-eight units and gear 196 has twenty teeth, for example, then the period self-opening switch 210 remains closed is selected to be about 20/288 of the total time necessary for drive motor 88 to lower trolleys 72 from the uppermost extent to the lowermost extent of their travel. Upon reopening of switch 210, the interlock circuit comprising interlocked contacts R2A is opened, and relay R2 is normally then de-energized until such a time as limit switch M2 is again closed by pin lug 200. Should the operator of the equipment desire to manually index lowering arms 70 to a lower position for some reason, manually operated switch S2 is provided in parallel with limit switch M2. Should the operator desire to interrupt the normal indexing movement of the lowering gates 70, then manual switch S4 is available to him for this purpose.

In the circuit presented at FIG. 8, actual energization of lowering drive motor 88 is through contacts R2B, R2C and R2D of relay R2, which latter contacts R2C and R2D also function in a direction reversing circuit for said drive motor 88, as discussed more fully below. However, when relay R2 is energized, said contacts R2C and R2D are moved into their down connection (D) with drive motor 88, and such down direction of drive continues as long as said relay R2 remains energized. Contact R2B functions to isolate the down drive energization of drive motor 88 from the up drive energization circuit and prevent any possibility of the updrive energization control being applied inadvertently to the drive motor when connected for down drive. Contact R2E of relay R2 also serves an interlock function, being normally closed in the energization circuit for return relay R3 and disabling same whenever lowering relay R2 is energized At such a time as trolleys 72 reach their lowermost extent of travel and lowering gates 70 are unlatched as shown in broken line at FIG. 3, a trolley 72 engages and closes a normally open limit switch M4 which energizes raising relay R3, assuming relay R2 is de-energized (with contacts R2E closed), whereupon interlock contacts R3A of relay R3 are closed and the energization circuit for motor 88 is also closed through contact R3B, contact R2C (in the up position U), and contact R2D (also in the up position U). Manual switch S1 parallels limit switch M4 so that the operator can manually energize the trolley raising circuit if such action out of the normal sequence is desired. With M4 or S1 momentarily closed, energization of motor 88 to drive trolleys 72 in their upward direction of movement then continues as long as relay R3 remains energized, which condition normally pertains until such a time as a trolley 72 engages and opens a normally closed limit switch M5 situated to be contacted by said trolley 72 at its upper extent of travel.

Limit switches M1 and M2 in the counter mechanism C are arranged with respect to the arc of travel of respective lugs 192 and 200 when contacting the poles of the switches to be closed just momentarily and only at a time when such pin lugs are actually moving. In other words, there is no closure of these switches when switch lugs are stopped, i.e. unless there is indexing motion of ratchet wheel 174. Such an arrangement overcomes the possibility that either of these switches might remain closed for a considerable time should there be a delay in the arrival of the next incoming unit L delivered to the bin B.

Summarizing the manner of operation involved in each accumulator bin B, in the light of the control circuit shown at FIG. 8, and assuming there are no accumulated units L in the bin B, and further assuming lowering arms L have returned to a state of rest in their uppermost position spanning bin B, accumulation of successive predetermined increments of units results in periodic incremental lowering of the trolleys 72 and gates 70 by successive energizations of relay R2 for short periods determined by delayed open switch 210, which progressive filling of the bin and lowering of the gates continues until latch arm 89 contacts plate 96 and unlatches the gates 70 whereupon the gates 70 swing away from the accumulated units L, the main weight of which is then transferred to the discharge assembly comprising discharge chains 100. This action is timed to occur at about the same time the total number of units desired to make a package have come into the main storage area of bin B, on which occurrence pin lug 92 momentarily closes limit switch M1, energizing interrupter section cylinder 64 and moving interrupter arms 58 into elevated position to catch any further units coming into the bin B. Then, with the desired total number of accumulated units L segregated in the main storage area of the bin B, the operator selects a clear space on transport conveyor chains 132, then manually opens the bin release gate arms 158, and energizes the drive of discharge chains 100 by engagement of the associated clutch 116. The operator then permits the discharging action to continue until all accumulated units L in the main storage area of bin B are deposited on chains 132, after which the clutch 116 is disengaged and the bin release gate arms 158 are reclosed. In the meanwhile, limit switch M4 has been closed upon engagement thereof by a trolley 72 and raising relay R3 has been energized to energize drive motor 88 in the reverse direction, returning trolleys 72 to their uppermost position, whereupon they are stopped by the opening of limit switch M5. During this operation, lowering gates 70 have swung clear of the accumulated units and have become relatched in bin spanning position. Arrival of the trolleys 72 in their uppermost position has also opened limit switch M3 which deenergizes interrupter relay R1 and closes valve V1, in turn returning interrupter arms 58 to a lower position, allowing any units L accumulated in the interrupter section IS to slide down into the main storage area of bin B, coming to rest against the lowering gates 70. Progression of the lowering gates 70 and the continuing accumulation and discharge of the next group of units L then proceeds in the same manner as before, and so on, cyclically.

Figure 9:
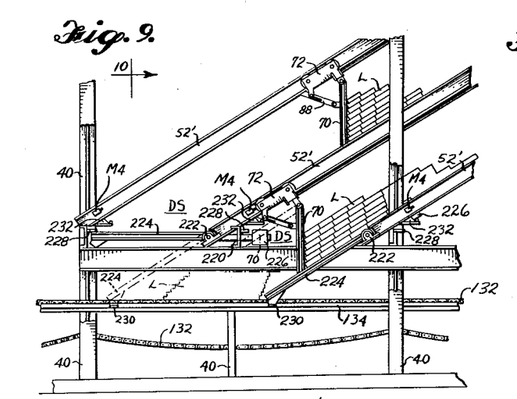
FIG. 9 is a view in side elevation, similar to the view of FIG. 1, but showing a modified form of discharge section involving latchable, pivotally movable discharge beams.
Figure 10:
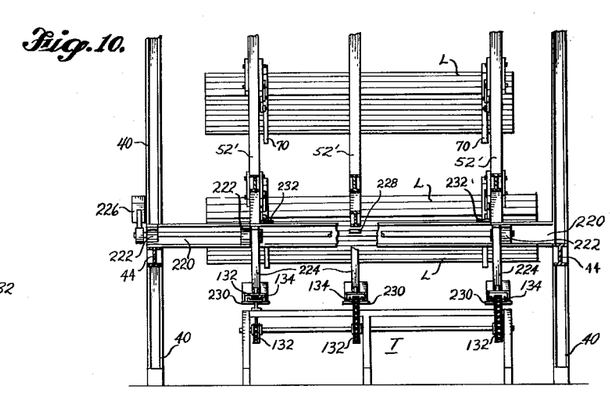
FIG. 10 is a view in end elevation of the modified form of assembly shown in FIG. 8.

FIGS. 9 and 10 serve to illustrate an alternative arrangement for discharging the accumulated groups of lumber units. The equipment assembly presented at FIGS. 9 and 10 will be understood to involve the same mechanisms as the form of the invention illustrated at FIGS. 1–8, except as otherwise noted in the following description. Thus, each of the accumulator bins B' incorporates the same arrangement of lowering gates 70 and trolleys 72, with like latching mechanism and raising and lowering mechanism, and such trolleys 72 track along the skid beams 52' in the same manner as in the earlier arrangement, except that the lowermost extent of travel thereof is somewhat beyond that characteristic of the earlier presented equipment. Also, the accumulating bins B' as shown at FIGS. 9 and 10 are employed in conjunction with an outfeed transport section T' which can be like section T of the earlier embodiment, except that the level of conveyor chains 132 and chain guideways 134 is placed somewhat lower relative to the lower ends of skid beams 52', for the reason that the manner of operation of the modified form of discharge section DS' is to deliver the group of accumulated units from bin B' to the transport section T' as a rather compactly placed group.

The lower ends of skid beams 52' rest on lateral beams 220, and pivotally mount by journals 222 a plurality of discharge beams 224 which are counterweighted by counterweights 226 to normally close the lower end of the associated bin B' in a substantially horizontal attitude, the free ends of said discharge beams 224 resting against stop plates 228 in such position, as shown in the left hand bin B' as viewed at FIG. 9.

When urged downwardly to discharge an accumulated group of units to transport section T', said discharge arms 224 rest on and are supported by suitably placed stop means such as stop plates 230 standing out from the sides of guideways 134 in section T', as best shown at FIG. 10. Alternatively, such stop means can be located at any desired point in the assembly, such as on skid beams 52' to be engaged by the arms carrying counterweights 226. Such alternative arrangement of the stop means for arms 224 has been found preferable in some installations in that the arrangement enables location of the stop means to provide that the lowermost position of the tips of arms 224 falls somewhat above transport chains 132. A random unit L riding on the chains 132 is thus free to pass under arms 224 even though said arms 224 are in discharging position, i.e. against the stop means.

In the form of the invention shown at FIGS. 9 and 10, accumulation of a group of lumber units L proceeds in the same manner as in the form of the invention shown at FIGS. 1–8, with trolleys 72 progressing down beams 52' during such procedure. As trolleys 72 carry lowering arms 70 past journals 222, the accumulated units L by their weight cause the discharge beams 224 to be urged to a down position to rest against stop plates 230, as illustrated in the right-hand bin B' in FIG. 9. Then, when trolleys 72 reach about their lowermost extent of travel, latch arms 89 are unlatched by trip bars 232 which correspond in function to latch plates 96, and the unlatched lowering gates 70 retract away from the accumulated lumber units which are then free to slide directly down onto conveyor chains 132 in the transport section T'. Closure of microswitch M4 by a trolley 72 initiates the return of the trolleys 72 to an uppermost position in the storage area of bin B', and as the group of lumber units L slides from discharge beams 224, the counterweights 226 automatically return said beams 224 to a bin closing position, with the free ends thereof again resting against stop plates 228, whereupon the accumulation of the next group of units proceeds in the characteristic manner until the lowering progression of lowering gates 70 again brings the next group of units into a lowered position where discharge beams 224 again are automatically opened along with the automatic unlatching of gates 70. In practice, it is desirable to have the last segment of travel of trolleys 72 occur as a continuous movement immediately or very shortly after the accumulation of the desired total number of units in the main storage area of bin B'. Such action is desirable in order that the accumulation of the number of units just short of a full package does not possibly impede the travel of earlier discharged groups on conveyor chains 132. In others words, as will be apparent, discharge beams 224 should be in the down position as short a time as possible. Since a given accumulated group of units is discharged as a group and generally compactly placed on the conveyor chains 132, discharge section DS' can normally employ fully automatic discharge of any given bin B', in that it is unlikely that an earlier placed group of units will be in the way on the continuously driven conveyor chains 132. Moreover, should there happen to be an accumulated group of units directly under set of discharge beams 224 when such begin to move downwardly, the units already on the conveyor chains 132 tend to hold up the discharge beams 224 until at least most of the units already on the chains 132 pass under the beams 224. Manual interrupt switch S4 is also available to the operator in the energization circuit for drive motor 88, as shown at FIG. 8, so that the operator can stop the movement of the trolleys 72, either when lowering or raising the gates 70, one possible emergency use of such manual switch S4 being to interrupt the lowering movement of trolleys 72 just before discharge beams 224 are urged downwardly, after which the beam lowering action can be continued by the operator closing manual switch S2 when sufficient clear space on chains 132 is available to receive the accumulated units.

Alternatively, in order to obviate any possibility of the lowered discharge beams 224 encountering a group of accumulated units previously discharged to the conveyor chains 32, the energization period of delayed open switch 210 can be set to bring trolleys 72 down only to a point where beams 224 start to lower. Then, when the operator observes chains 132 to be clear below the bin B, he selectively initiates unlatching of gates 70 and movement of beams 224 to discharge position by closing manual switch S2 (FIG. 8).

From the foregoing, other modifications, variations, arrangements and applications characteristic of the invention will occur to those skilled in the arts to which the invention is addressed, within the scope of the following claims.

What is claimed is:

1. In a lumber unit accumulator having an expansible storage area for accumulated units; the improvement permitting expansion of said storage area as said storage area fills, said improvement comprising:
    (a) trolley means reciprocably movable along one side of said storage area;
    (b) gate means pivotally mounted on and carried by said trolley means;
    (c) lockable latch means constituting part of said gate means and maintaining said gate means in storage area spanning position when locked; and
    (d) gate unlatching means encountered by said latch means at about the lowermost extent of travel thereof.

2. A lumber accumulating mechanism comprising, in combination:
    (a) a lumber storage area defined by sloping upper and lower beams members, the lower beam members forming skid surfaces for lumber units and the upper beam members forming support for movable trolley means;
    (b) movable trolley means supported on said upper beam members;
    (c) lumber lowering means depending from said trolley means, said lumber lowering means comprising gates pivotally mounted on said movable trolley means;
    (d) latching mechanism for normally retaining said lumber lowering means in a storage area spanning position, said latching mechanism having an unlatched position wherein said lumber lowering means is released from its storage area spanning position; and
    (e) automatic drive means for the lumber lowering means for lowering the same an extent generally related to and in response to number of lumber units received in the accumulating mechanism.

3. A lumber accumulating mechanism according to claim 2, wherein means are provided at the lower extent of travel of the trolley means to unlatch said latch means, whereby such lowering lumber gates are unlatched from said storage area spanning position and are moved pivotally by the weight of the accumulated units to permit discharge of said units out of the storage area.

4. Lumber accumulating mechanism according to claim 2, further comprising selectively operable lumber unit discharging mechanism situated at the lower end of said storage area.

5. Lumber accumulating mechanism according to claim 4, further comprising lumber unit discharging mechanism situated at the lower end of said lower beam members, such lumber discharge mechanism including a laterally spaced set of unloading chains delivering accumulated units from a point near the lower end of said lower beam members to a point where said units drop to outfeed transport means spaced below said lower beam members.

6. Accumulator mechanism according to claim 5, wherein said unloading chains have mounted thereon at spaced locations a series of pickup lugs dimensioned to contact and urge the accumulator units from the main accumulating section essentially one at a time.

7. Lumber accumulating mechanism according to claim 6, wherein a manually operable bin release gate is situated between said storage area and said discharging chains, such bin released gate when closed serving to maintain lumber units in the main accumulator section until such time as release thereof to said discharge conveyor is desired.

8. Lumber accumulating mechanism according to claim 7, wherein said bin release gate means comprises a plurality of spaced pivotally movable bars, said bars being associated with manually operable mechanism by means of which such are locked by overthrow linkage in either closed or open position.

9. Lumber accumulating mechanism according to claim 2, wherein a plurality of discharge means are pivotally mounted at the lower end of said beam members, said discharge beams being counterweighted to maintain a position normally spanning the discharge area of said storage area, and stop means associated with a free end of said discharge beams, said discharge beams upon receiving the weight of some of the accumulated units in the storage area then moving into substantial alignment with said skid means by action of the weight of the accumulated units overcoming the counterweighting of said discharge beams, the accumulated units when such discharge beams are in open position thereby having a substantially unrestricted, sloping course of travel down said skid means and said discharge beams to be received by transport means spaced below such accumulating mechanism.

10. Lumber accumulating mechanism according to claim 2, further comprising means delivering lumber units to the lumber storage area, a counting mechanism cyclically registering the number of units delivered to the lumber storage area, an interrupter mechanism comprising a plurality of pivotally movable arms raisable into the path of travel of lumber units down the sloped beam members, and control means for moving said arms between unit interrupt and unit non-interrupt positions, such control means including power means cyclically actuated by said counter mechanism upon registration thereof of a predetermined unit count, the same arms when in such interrupt position serving to prevent passage of lumber units into the main accumulating section of said storage area situated below said interrupter arms.

11. Lumber accumulating mechanism according to claim 10, wherein said pivotally movable arms are each configured substantially in the form of a sector of a cylinder.

12. A lumber unit accumulating mechanism having a series of storage areas each receiving and segregating a predetermined number of lumber units of a particular classification, each such storage area comprising:
(a) a plurality of spaced skid beams arranged at a slope with respect to a point of discharge of lumber units thereof;
(b) a main accumulator section comprising a set of latchable lumber lowering gates disposed to normally span said storage area when latched;
(c) trolley means carrying said lowering gates;
(d) means for progressively lowering said trolley means and lowering gates as a progressively increasing number of units are received in said section;
(e) means for unlatching said lowering gates at about their lowermost extent of travel; and
(f) unit counting means situated to be actuated by each lumber unit as such as discharged into the storage area, the said counting means in turn actuating mechanism regulating the extent of movement of said lowering gates.

13. A sorted lumber unit accumulating mechanism having a series of storage areas each receiving and segregating a number of lumber units of a particular classification, each such storage area comprising:
(a) a plurality of spaced skid beams arranged at a slope with respect to a point of discharge of lumber units thereof;
(b) an interrupter section in the upper portion of said skid beams;
(c) a main accumulator section in the lower portion of said skid beams;
(d) a set of movable lumber lowering gates disposed to normally span said accumulator section;
(e) trolley means mounting said lowering gates;
(f) means for reciprocally moving said trolley means with respect to said skid beams;
(g) a unit counting mechanism actuated by each lumber unit as such as discharged into said storage area; and
(h) means regulating the extent of lowering movement of said trolley means and lowering gates in response to the unit count registered by said unit counting mechanism to expand the storage area in direct relation to the number of lumber units accumulated therein.

14. A lumber accumulating mechanism according to claim 13, wherein said unit counting mechanism comprises a count accumulator having a number of indexed elements corresponding to the total number of lumber units to be cyclically accumulated and segregated in the storage area of said accumulating mechanism.

15. A lumber accumulating mechanism according to claim 14, wherein said count accumulator comprises:
(a) an endless chain for registering unit counts;
(b) lug means on said chain;
(c) a first microswitch positioned in the path of travel of said lug means to be energized thereby upon each cycle of revolution of the chain;
(d) a counting gear;
(e) lug means carried by said counting gear; and
(f) a second microswitch positioned in the path of travel of said counting gear and actuated by the lug means thereof, said first microswitch initiating the interruption of lumber unit delivery at said interrupter section, and said second microswitch controlling movement of said trolley means.

References Cited in the file of this patent

UNITED STATES PATENTS

| | | |
|---|---|---|
| 399,011 | Briggs | Mar. 5, 1889 |
| 746,248 | Baggaley | Dec. 8, 1903 |
| 825,246 | Seaman et al. | July 3, 1906 |
| 1,333,378 | Buckley et al. | Mar. 9, 1920 |
| 1,472,054 | Drake | Oct. 30, 1923 |
| 1,588,950 | Drake | June 15, 1926 |
| 1,656,920 | McLean | Jan. 24, 1928 |
| 1,744,407 | Meccia et al. | Jan. 21, 1930 |
| 1,985,218 | Stock et al. | Dec. 18, 1934 |
| 2,341,386 | Reichelt et al. | Feb. 8, 1944 |
| 2,431,791 | De Palma et al. | Dec. 2, 1947 |
| 2,606,483 | Forbes | Aug. 12, 1952 |
| 2,613,825 | Setzer et al. | Oct. 14, 1952 |
| 2,808,946 | Just et al. | Oct. 8, 1957 |
| 2,895,624 | Oster | July 21, 1959 |
| 2,969,883 | Cargill et al. | Jan. 31, 1961 |
| 3,024,922 | Clark et al. | Mar. 13, 1962 |